March 18, 1958 R. I. GUY ET AL 2,826,853
FISH BAIT AND METHOD OF PREPARING THE SAME
Filed May 25, 1955

RALPH I. GUY
GEORGE K. LAIT
INVENTORS.

BY Robert M. McManigal
Attorney

United States Patent Office 2,826,853
Patented Mar. 18, 1958

2,826,853

FISH BAIT AND METHOD OF PREPARING THE SAME

Ralph I. Guy, Glendale, and George K. Lait, North Hollywood, Calif.

Application May 25, 1955, Serial No. 510,960

1 Claim. (Cl. 43—42.06)

This invention relates generally to fishing tackle, and relates more particularly to improvements in artificial fish baits or lures.

It is an object of the present invention to provide a device of this character that is adapted to be used as a substitute for natural fish bait.

Another object of the invention is to provide a device of this character that is highly effective as a fish lure.

Still another object of the invention is to provide a device of this character that stimulates or entices fish to strike.

A further object of the invention is to provide a device of this character that has action and simulates live bait in a lifelike manner.

A still further object of the invention is to provide a device of this character that will wiggle and weave in the water as a result of the action of the current or movement of the lure drawn through the water by the fisherman.

Another object of the invention is to provide a device of this character that is strong and durable enough to be used repeatedly.

Still another object of the invention is to provide a device of this character having an aroma or scent which will attract fish and tend to make them strike the bait or lure.

A further object of the invention is to provide a device of this character adapted to retain its fish-attracting scent for a relatively long period of time.

A still further object of the invention is to provide a device of this character having a container for convenient storage when the lure is not in use.

Another object of the invention is to provide a device of this character wherein said container has means for absorption of excess scented liquid in which the liquid absorbing part is saturated during the manufacturing process, thus facilitating manufacturing and packaging the device.

Still another object of the invention is to provide an arrangement of this character wherein said means may have additional scented liquid applied thereto which will be absorbed by the liquid absorbing part of the device when it has been replaced in the container after being used.

A further object of the invention is to provide a device of this character, together with its container, which can be manufactured readily and economically.

The characteristics and advantages of the invention are further sufficiently referred to in connection with the following detailed description of the accompanying drawings which illustrate one embodiment. After considering this example, persons skilled in the art will understand that many variations may be made without departing from the principles disclosed, and we contemplate the employment of any structures, arrangements or modes of operation that are properly within the scope of the appended claim.

Referring to the drawings.

Figure 1:
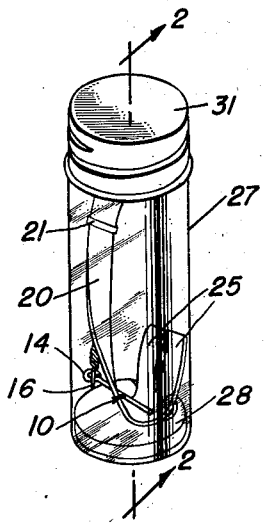
Fig. 1 is a perspective view of a fish lure and container therefor embodying the present invention.
Figure 2:
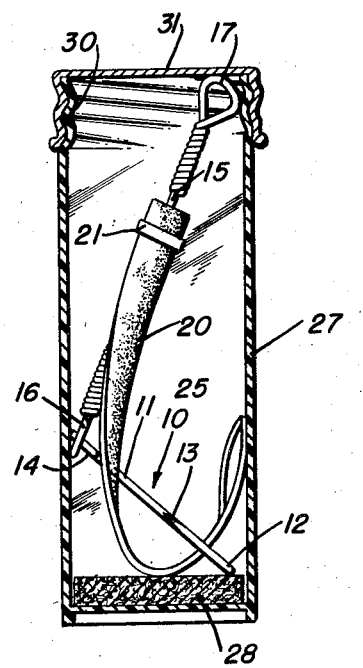
Fig. 2 is an enlarged longitudinal section through the same.
Figure 3:
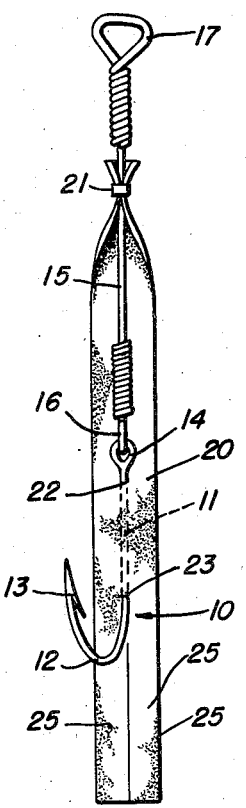
Fig. 3 is an enlarged front elevational view of the lure or bait device.

Referring more particularly to the drawings, the bait device or lure comprises a fish hook, indicated generally at 10, having a shank 11 terminating at one end in a bent or curved portion 12 with a barb 13 at the free end thereof. At the opposite end of the shank is an eye 14. A flexible leader 15 has an eye 16 at one end attached for articulating to the eye 14 of the hook, there being an eye 17 at the opposite end of the leader for atttachment of a fish line, not shown. The leader may be of any suitable material, such as flexible wire or the like. A strip of chamois 20, which is flexible, has one end secured to the leader intermediate the ends of the latter by any suitable means, shown as comprising a metal band or staple 21. The chamois strip 20 is also threaded at points 22 and 23 onto the shank 11 of the hook, leaving a free end portion beyond the curved portion 12 of the hook, said free end portion being longitudinally cut to provide a plurality of free end parts 25 that are relatively narrow and which are extremely flexible so as to wiggle or weave from the action of the current or movement of the water thereon, or by reason of the device being drawn through the water by the fisherman.

The main body of the strip 20 will also have a wiggling or weaving movement due to the fact that it spans the articulable connection between the leader and hook. When that portion of the strip between the point 22 and the point of attachment to the leader moves articulation of the above-mentioned connection will occur. Thus, there will be additional action of the device, that is, the movement of the hook and leader relative to each other, action which is in addition to that of the chamois strip.

In order to provide an additional attraction for fish the chamois strip 20 is saturated with or has applied to it a scenting agent which may be a liquid material or the like that will be absorbed by or will adhere to said strip 20. Any suitable fish attracting scented material may be used such as, for example, anise, fish oil, or the like. A more or less oily material which will keep the chamois strip soft, flexible and pliable is very advantageous.

Also, the scented material may be colored to impart color to the chamois strip, hook and leader. Red has been found to be an effective color for the lure or bait device of the present invention.

In manufacturing the device the parts thereof are assembled as shown in the drawing and the chamois strip and co-extending portions of the hook and leader are dipped into the scented liquid material. The device is then placed in a container 27 of suitable size, said container being shown as cylindrical in shape and of transparent material such as a transparent plastic.

On the bottom of the container is a pad or disk 28 of absorbent material, such as felt or the like, which will absorb excess scented liquid material which may accumulate at the end of the strip of chamois and the hook when the device is placed in said container. This step in getting the device ready for the market saves considerable time. An added advantage of this arrangement is that the scented material absorbed by the disk, or at least some of it, will be transferred back to the chamois strip when the device is replaced in the container after being used. If desired, the pad may be provided with additional scented material so that more of such material will be absorbed by the chamois when the device is replaced in the container after being used.

A closure of any suitable character may be used to close the open end of the container. As shown, said open end of the container is provided with screw threads 30 on which a threaded cap 31 of suitable material and character is screwed. When thus closed the device may be stored and/or carried about by the fisherman.

It is to be understood that the present invention has been described in connection with the details of an illustrative embodiment, and that variations may be made therein without departing from the scope of the invention, which generally comprises a device adapted to carry out the objects and advantages set forth hereinabove, in the novel parts and arrangements disclosed and defined in the appended claim.

We claim:

A device of the character described, comprising: a fish hook having a shank with a curved portion at one end terminating in a barb, there being an eye at the opposite end of said shank; a flexible wire leader having an eye at one end attached to the eye of the hook to provide a connection that may be articulated, said leader having an eye at the opposite end to which a fish line may be attached; a strip of chamois; a metal band securing one end of the chamois strip to the leader intermediate the ends thereof, said strip spanning said connection and being threaded onto the shank of said hook, a free end portion of said strip extending beyond the curved end of the hook and being longitudinally cut to provide a plurality of free end parts that will readily wiggle and weave in the water; and colored, scented material saturating said chamois strip.

References Cited in the file of this patent

UNITED STATES PATENTS

| | | |
|---|---|---|
| 958,232 | Crider | May 17, 1910 |
| 1,249,194 | Race | Dec. 4, 1917 |
| 1,450,777 | Hummell | Apr. 3, 1923 |
| 1,750,783 | Pemberton | Mar. 18, 1930 |
| 1,816,725 | Freeman | July 28, 1931 |
| 2,091,457 | Sauer | Aug. 31, 1937 |
| 2,503,672 | Johnson | Apr. 11, 1950 |
| 2,611,984 | Gautsche | Sept. 30, 1952 |
| 2,745,206 | Gaw | May 15, 1956 |